Sept. 29, 1936.                C. H. HAPGOOD                    2,055,531
                               MILKING MACHINE
                             Filed Aug. 26, 1935
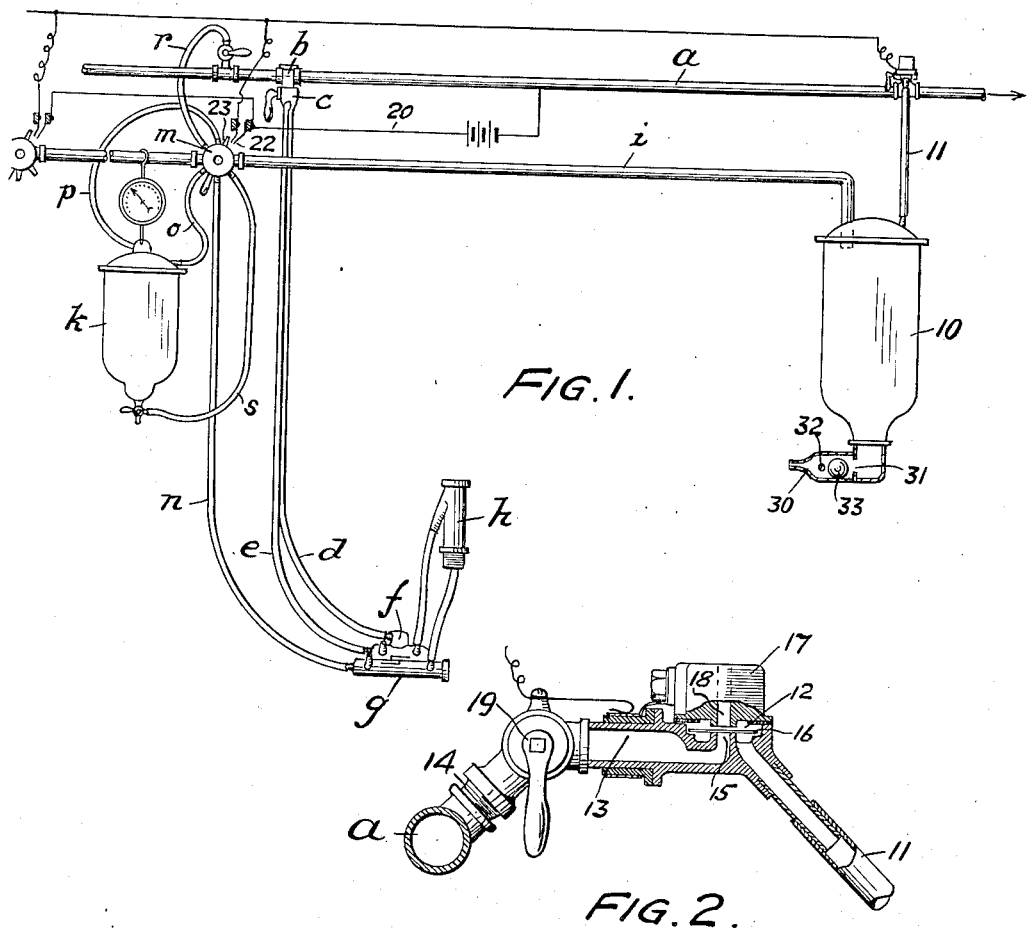
WITNESS:                                              INVENTOR
                                              Cyrus Howard Hapgood
                                                        BY
                                                Busser and Harding
                                                      ATTORNEYS.

Patented Sept. 29, 1936

2,055,531

UNITED STATES PATENT OFFICE 2,055,531

MILKING MACHINE

Cyrus Howard Hapgood, Nutley, N. J., assignor to The De Laval Separator Company, New York, N. Y., a corporation of New Jersey Application August 26, 1935, Serial No. 37,897

5 Claims. (Cl. 31—58)

A well known system for milking cows comprises a milk pipe line and a vacuum pipe line; a series of milking units each comprising a set of teat cups, a milk receiver or pail, and air and milk conduits; and valve mechanism for each unit which is movable into milking position to connect the top of the pail with the vacuum pipe line and a set of teat cups (in which position the teat cups are operable to milk and the milk is discharged therefrom into the pail) and which is movable into another position to connect the top of the pail with atmosphere and the bottom of the pail with the milk pipe line (in which position the milk is discharged from the pail into the milk pipe line). Such a system is set forth in patents granted to me February 23, 1932 (No. 1,846,805) and July 30, 1935 (No. 2,009,399). In this system the milk pipe line is under a constant vacuum and the milk delivered thereinto from the pail is discharged either into a storage tank or a releaser; the connection between the vacuum pump and the milk pipe line being established through said storage tank or releaser.

My invention is more particularly intended for embodiment in systems employing releasers. In such systems the releaser is necessarily of the twin type, as shown in the earlier of the patents above mentioned. The use of twin releasers has been deemed to be essential. The operation of a releaser requires that it shall be placed alternately under vacuum to receive the milk and under pressure to discharge the milk. To obtain a continuous vacuum pull on the milk pipe line, it is necessary to provide two releasers, to connect them alternately with the vacuum pump and the atmosphere, and to connect the releaser under vacuum with, and disconnect the releaser under atmosphere from, the milk pipe line. Only by this expedient can the milk pipe line be continuously connected with vacuum.

In comparatively large installations, wherein milk is being discharged through the milk pipe line practically continuously, this arrangement is satisfactory from the standpoints of both efficiency and economy. In the case of small installations, wherein the discharge of milk through the milk pipe line is subject to frequent interruptions, the cost of installing the system, notwithstanding its advantages, is a handicap to commercial exploitation. I have devised a modification of or improvement in the described system, more particularly intended for small installations, whereby a single releaser may be substituted for twin releasers and whereby the construction of the single releaser may be simplified. This improvement forms the subject-matter of the invention hereinafter claimed. By means of the improvement, the cost of the system may be so reduced that its use in small installations becomes economically practicable.

A preferred embodiment of the invention is shown in the drawing, wherein—

Fig. 1 is a diagram of the complete milking machine.

Fig. 2 is a sectional view of the valve that controls the connection of the releaser with vacuum and atmosphere and of the electro-magnet that controls the valve.

Fig. 3 is a cross-sectional view of the master valve.

Along the vacuum pipe line $a$ are mounted any number of T's $b$ to each of which is attached a connector $c$ connected with a vacuum hose $d$ and a pneumatic pulsation hose $e$. The connector $c$ is ported to connect vacuum hose $d$ with the vacuum line $a$ and carries a magnetically operable pneumatic pulsation valve (not shown) whereby pulsation hose $e$ is connected alternately with the vacuum pipe line $a$ and with atmosphere.

The hoses $d$ and $e$ connect with the valve chamber $f$ of a claw, the operation of the valve in this chamber being controlled by the pulsations in hose $e$ and producing pulsations in the outer or pulsation chambers of the teat cups $h$. The inner or milk chambers of the teat cups communicate, through the milk chamber $g$ of the claw, with the milk hose $n$. The teat cups and claw shown and briefly described may be constructed as shown in the Leitch Patent No. 1,255,186, February 5, 1918. The claw and the vacuum hose $d$ may be omitted and the pulsation hose $e$ may connect direct with the pulsation chambers of the teat cups and the milk or teat chambers of the teat cups may connect direct with hose $n$.

On the milk pipe line $i$ is mounted a master valve $m$. This valve may be constructed as shown and described in either of the foregoing patents, or any other valve mechanism may be substituted that will enable the connections described hereinafter and also in said patents to be made. It is sufficient to state that the valve $m$ may be moved into one milking position to connect milk hose $n$, through a nozzle $n'$, a nozzle $o'$, and a milk hose $o$, with the pail $k$ and at the same time connect the pail $k$, through an air hose $p$, nozzle $p'$, nozzle $r'$ and an air hose $r$, with vacuum line $a$, thereby causing milk to flow from the teat cups to the pail; and that the valve $m$ may be moved into another position to connect pail $k$, through a milk hose $s$, nozzle $s'$ and port $s^2$ with the milk line $i$ and at the same time connect pail $k$, through air hose $o$, nozzle $o'$ and a port $o^2$ with atmosphere, thereby causing the milk in the pail to be discharged into the milk pipe line. The arrangement and operation may be the same as that described in either of the aforementioned patents.

Milk pipe line $i$ connects with a single releaser 10. On the vacuum pipe line $a$ is mounted a connector, shown in Fig. 2, whose construction involves merely a slight simplification of that shown in a patent granted to me May 30, 1933, No. 1,911,618. A brief description of the connector will, therefore, suffice. It comprises a casing enclosing a vacuum chamber 13 having a pipe connection 14 with vacuum pipe $a$ and an air chamber 12 the lower part of which is of annular shape. Air chamber 12 is connected through a pipe or hose 11 with releaser 10. By means of a valve 19 chamber 13 may be connected with the vacuum line $a$ at the start of the milking operation. Vacuum chamber 13 has a port 15 opening upward and positioned centrally of the annular part of air chamber 12. Over port 15, in air chamber 12, is a disc armature valve 16, which normally seats on and closes port 15. Mounted on the casing is the housing of an electro-magnet 17. The magnet surrounds a vertical tube 18 which, at its upper end, is open to the atmosphere and aligns with port 15.

When magnet 17 is de-energized, armature valve 16 seats on and closes port 15, and air chamber 12 is connected, through tube 18, with the atmosphere. When the magnet is energized, armature valve 16 is lifted off its seat against the lower end of tube 18, and air chamber 12, through port 15, is put into communication with vacuum chamber 13.

The opening and closing of the electric circuit 20 including magnet 17 is controlled from the master valves $m$ by any suitable means whereby, when any one of the several master valves is moved into position to connect the corresponding pail $k$ with the milk pipe line $i$, the circuit through the magnet 17 will be closed, thereby lifting armature valve 16 and connecting the milk pipe line with vacuum through releaser 10, pipe 11, air chamber 12, vacuum chamber 13, pipe 14 and vacuum line $a$. The circuit closing means may comprise a number of circuit closers, corresponding to the number of milking units, arranged in circuit 20, each circuit closer comprising a fixed contact 22 and a movable contact 23. The latter may be normally spaced from contact 22, but may be of spring metal so as to be movable into contact therewith. When any master valve is moved into position to connect the corresponding milk pail $k$ with the milk pipe line $i$, it engages contact 23 and moves it to close the circuit through the corresponding circuit closer, thus energizing the magnet. When none of the master valves is in this position, the circuit is opened through the magnet, the armature valve 16 will drop and atmospheric air will flow through tube 18, chamber 12 and pipe 11 to releaser 10.

The lower end of the releaser is contracted to form a neck opening into a laterally extending outflow channel 30 having at its entrance a valve seat 31. Channel 30 has a contracted discharge end. Between the valve seat and a pin or stop 32 extending across or within channel 30 is a freely movable ball valve 33 preferably of rubber. When the releaser 10 is connected with vacuum, valve 33 is held against seat 31 by atmospheric pressure and milk accumulates in the releaser. When the releaser is connected with the atmosphere, the pneumatic pressures above and below the body of milk in the releaser are balanced and the milk, by its own weight, unseats valve 33 and is discharged.

It will therefore be understood that as long as milk is flowing through the milk pipe line $i$ (which is the condition when any one or more of the master valves $m$ is positioned to connect its pail with the milk pipe line $i$) the releaser is under vacuum and will function to receive and accumulate milk, but that as soon as the milk flow through the milk line is interrupted (which occurs only when none of the master valves is positioned to connect its pail with the milk line $i$) the releaser is under air pressure and will discharge the accumulated milk. The rate of discharge of milk from the releaser greatly exceeds the normal rate of inflow of milk into the receiver. In a small installation the interruptions in the flow of milk to the releaser are sufficiently frequent and of sufficient duration to insure against the releaser becoming, at any time, completely filled.

In the milking system to which my invention is applicable, the cost of the releasers represents a material proportion of the cost of the entire installation. In my invention, not only is one releaser dispensed with, but the operation described enables the construction of the remaining releaser to be simplified and therefore to be constructed at a substantially lower cost.

It will be understood that when reference is made to establishing connections with vacuum and atmosphere respectively, I mean to include as an equivalent any two substantially different absolute pneumatic pressures.

What I claim and desire to protect by Letters Patent is:

1. In a milking machine, the combination with a milk pipe line, a source of vacuum, and a plurality of milking units each comprising a pail, a set of teat cups, air and milk conduits and valve mechanism movable into one position to cause milk to flow from the teat cups to the pail and into another position to discharge milk from the pail to the milk line; of a single releaser connected with the milk line and which is in connection with the atmosphere when none of said valve mechanisms is in the second position specified, and means controlled by said valve mechanisms, adapted, when any of said valve mechanisms is moved into the second position above specified, to close said atmospheric connection to the releaser and to connect it with the source of vacuum.

2. In a milking machine, the combination with a milk pipe line, a source of vacuum, and a plurality of milking units each comprising a pail, a set of teat cups, air and milk conduits and valve mechanism movable into one position to cause milk to flow from the teat cups to the pail and into another position to discharge milk from the pail to the milk line; of a single releaser connected with the milk pipe line, an air pipe connected with the releaser, a valve which is movable to connect said air pipe alternately with the atmosphere and said source of vacuum, an electro-magnet controlling said valve, an electric circuit including said magnet, and means controlled by said valve mechanisms to control the closing of said circuit.

3. In a milking machine, the combination with a milk pipe line, a source of vacuum, and a plurality of milking units each comprising a pail, a set of teat cups, air and milk conduits and valve mechanism movable into one position to cause milk to flow from the teat cups to the pail and into another position to discharge milk from the pail to the milk line; of a single releaser connected with a milk pipe line, an air pipe connected with the releaser, a valve adapted in one position to open said air pipe to the atmosphere and in another position to connect said air pipe with the source of vacuum, an electro-magnet adapted when energized to move said valve into the second named position, an electric circuit including said magnet, and means, operable only when any of said valve mechanisms is in its second position above specified, to close the circuit through the magnet.

4. In a milking machine, the combination with a milk pipe line, a source of vacuum, and a plurality of milking units each comprising a pail, a set of teat cups, air and milk conduits and valve mechanism movable into one position to cause milk to flow from the teat cups to the pail and into another position to discharge milk from the pail to the milk line; of a single releaser connected with the milk line and which is in connection with the atmosphere when none of said valve mechanisms is in the second position specified, and means controlled by said valve mechanisms, adapted, when any of said valve mechanisms is moved into the second position above specified, to close said atmospheric connection to the releaser and to connect it with the source of vacuum; and a valve adjacent the milk discharge from the releaser and adapted, when the releaser is under vacuum, to close the discharge and adapted, when the releaser is connected with the atmopshere, to open said discharge.

5. In a milking machine, the combination with a milk pipe line, a source of vacuum, and milking units each comprising a pail, a set of teat cups, air and milk conduits and valve mechanism movable into one position to cause milk to flow from the teat cups to the pail and into another position to discharge milk from the pail to the milk line; of a single releaser connected with the milk line and which is in connection with the atmosphere when none of said valve mechanisms is in the second position specified, and means controlled by said valve mechanisms, adapted, when any of said valve mechanisms is moved into the second position above specified, to close said atmospheric connection to the releaser and to connect it with the source of vacuum; a milk channel through which the milk is discharged from the releaser, a valve seat at the entrance of the channel, and a ball valve in the channel which is held against its seat by atmospheric pressure when the releaser is under vacuum and which is unseated when the receiver is connected with the atmosphere by the weight of milk in the receiver to effect the discharge of milk through said channel.

CYRUS HOWARD HAPGOOD